(12) United States Patent
Cheng

(10) Patent No.: US 7,713,010 B2
(45) Date of Patent: May 11, 2010

(54) SELF-DRILLING WALL ANCHOR DEVICE

(76) Inventor: Ming Chia Cheng, No. 23, Lane 133, Sec. 2, Gonyuan West Road, Gansan Town, Kaoshiung Hsien 82052 (TW)

( * ) Notice: Subject to any disclaimer, the term of this patent is extended or adjusted under 35 U.S.C. 154(b) by 343 days.

(21) Appl. No.: 11/520,360

(22) Filed: Sep. 13, 2006

(65) Prior Publication Data
US 2008/0063488 A1 Mar. 13, 2008

(51) Int. Cl.
*F16B 13/04* (2006.01)
(52) U.S. Cl. ........................................ 411/29; 411/80.1
(58) Field of Classification Search .................. 411/29, 411/34, 36–39, 400, 401, 14.5, 21, 90, 42, 411/80.1, 80.5, 80.6
See application file for complete search history.

(56) References Cited

U.S. PATENT DOCUMENTS

| | | | | |
|---|---|---|---|---|
| 2,913,953 A * | 11/1959 | Tendler | ........................ | 411/29 |
| 3,606,814 A * | 9/1971 | MacKenzie | ................ | 411/80.2 |
| 3,854,374 A * | 12/1974 | Boyle et al. | ................. | 411/80.1 |
| 4,391,559 A * | 7/1983 | Mizusawa | ..................... | 411/45 |
| 5,147,166 A | 9/1992 | Harker | ........................ | 411/29 |
| 5,569,005 A * | 10/1996 | Millington | .................... | 411/34 |
| 5,690,454 A | 11/1997 | Smith | .......................... | 411/30 |
| 6,065,918 A | 5/2000 | Adams | ........................ | 411/29 |
| 2006/0067803 A1* | 3/2006 | Hsu | ............................ | 411/29 |
| 2006/0228188 A1* | 10/2006 | Hsu et al. | ..................... | 411/29 |
| 2008/0008554 A1* | 1/2008 | Lu | ............................... | 411/29 |

* cited by examiner

*Primary Examiner*—Gary Estremsky
(74) *Attorney, Agent, or Firm*—Rosenberg, Klein & Lee

(57) ABSTRACT

A wall anchor device includes an anchor sleeve having an outer peripheral lip, one or more peripheral flanges extended outwardly from the middle portion for engaging with a wall member. The anchor sleeve includes a middle portion having one or more arms. A threaded member is engageable into the anchor sleeve and includes a thread shank for threading with the anchor sleeve. A drill element is secured to the threaded member, to drill the anchor sleeve into the wall. The anchor sleeve includes a projecting device for ensuring the threaded member to be engaged with the inner end portion of the anchor sleeve. A positioning device may position the anchor sleeve and the threaded member to the work piece and the wall member.

8 Claims, 9 Drawing Sheets

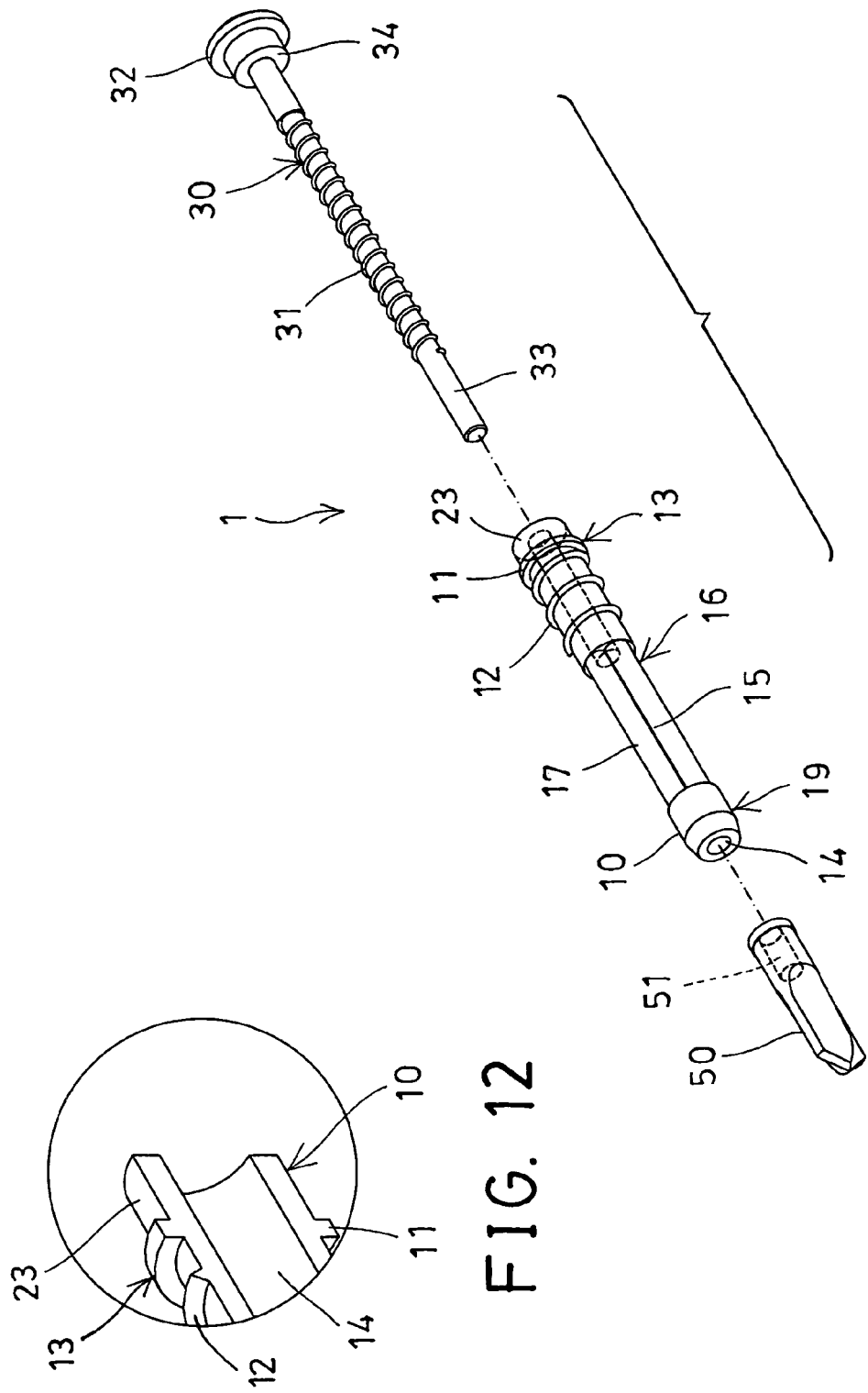

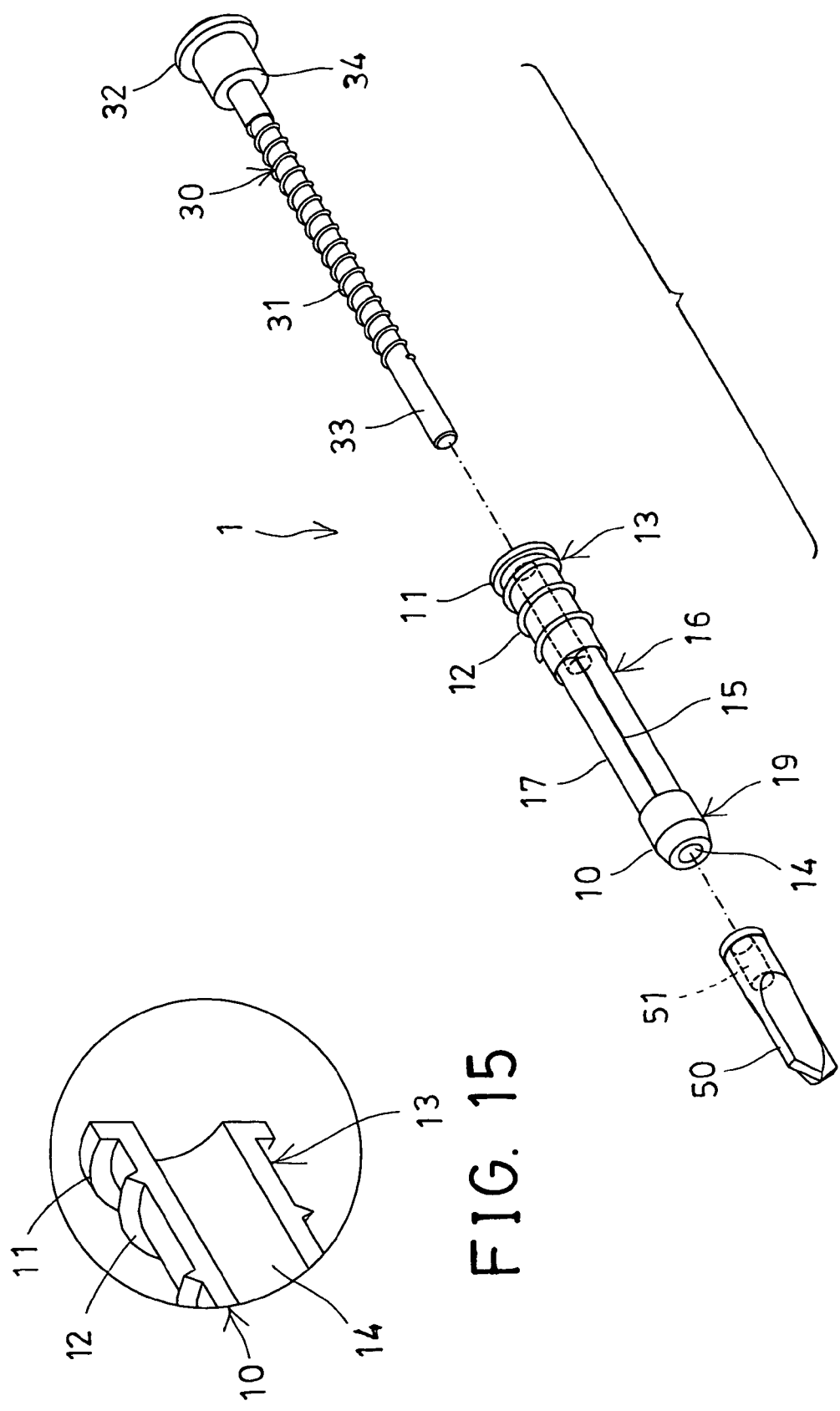

SELF-DRILLING WALL ANCHOR DEVICE

BACKGROUND OF THE INVENTION

1. Field of the Invention

The present invention relates to a wall anchor device, and more particularly to a self-drilling wall anchor device having an expandable and threaded structure for solidly engaging or securing to wall members or the like and for ensuring the operation of the self-drilling wall anchor device.

2. Description of the Prior Art

Various kinds of typical wall anchor devices have been developed, and comprise a threaded fastener threaded in an expandable outer casing, to expand the outer casing and thus to engage and secure the wall anchor devices to wall members or the like.

For example, U.S. Pat. No. 5,147,166 to Harker discloses one of the typical wall anchor devices comprising a threaded bolt threaded in an expansible body element, to expand the expansible body element and thus to engage and secure the wall anchor devices to wall members or the like.

The expansible body element includes a number of connecting bands bowed slightly outwardly in the provision of angularly inclined legs. However, similarly, the angularly inclined legs of the expansible body element include a planar outer surface and may only be bent, but may not be forced to engage into the wall members, such that the typical expansible body element may not be solidly secured or anchored in blind holes of wall members.

U.S. Pat. No. 5,690,454 to Smith discloses another typical wall anchor device which comprises a threaded bolt threaded in an expansible screw anchor to expand the expansible screw anchor and thus to engage and secure the wall anchor devices to wall members or the like. However, similarly, the expansible screw anchor includes a planar outer surface and may only be bent, but may not be forced to engage into the wall members, such that the typical expansible screw anchor also may not be solidly secured or anchored in blind holes of wall members.

U.S. Pat. No. 6,065,918 to Adams discloses a further typical wall anchor device which comprises an insert having a drilling blade for drilling into wall members or the like, and a threaded bolt threaded into the insert to expand or bend the blade laterally or outwardly, and thus to engage and secure the wall anchor devices to wall members or the like. However, the insert of the typical anchor device includes a planar outer surface and may not be expanded and thus may not be solidly secured or anchored in blind holes of wall members.

In addition, in the typical wall anchor devices, the typical expansible sleeves or body elements are normally made of plastic materials which may be slightly expanded due to a hot weather or in a humid environment and may be shrunk due to a cold weather such that the inner threaded bolt may not suitably engage with the expansible sleeves or body elements in the hot weather and may be tightly engage with the expansible sleeves or body elements in the cold weather and such that the expansible sleeves or body elements may not be suitably expanded or twisted or deformed by the inner threaded bolt.

Furthermore, the inner threaded bolts and the expansible sleeves or body elements of the typical wall anchor devices have no locating or positioning device or structure provided thereon such that the expansible sleeves or body elements may not be timely expanded or twisted or deformed by the inner threaded bolt according to different thickness of the work pieces.

The present invention has arisen to mitigate and/or obviate the afore-described disadvantages of the conventional wall anchor devices.

SUMMARY OF THE INVENTION

The primary objective of the present invention is to provide a self-drilling wall anchor device including an expandable and threaded structure for solidly engaging or securing to wall members or the like and for ensuring the operation of the self-drilling wall anchor device.

In accordance with one aspect of the invention, there is provided a wall anchor device for engaging and anchoring into a wall member and for anchoring a work piece to the wall member, the wall anchor device comprising an outer anchor sleeve including an outer end portion having a peripheral lip extended outwardly therefrom for engaging with the wall member and for anchoring the outer anchor sleeve to the wall member and for limiting the outer anchor sleeve to move relative to the wall member, and including at least one peripheral flange extended outwardly from the outer end portion thereof for engaging with the wall member, and including a middle portion having at least one slot formed therein for forming at least one arm and for engaging with the wall member, and for selectively anchoring the outer anchor sleeve to the wall member, the outer anchor sleeve including a bore formed therein, and including an inner end portion, a threaded member engageable into the bore of the outer anchor sleeve, and including a thread shank for threading with the inner end portion of the outer anchor sleeve, and including an enlarged head provided on an outer end thereof for selectively engaging with the work piece, and including an inner end portion, and a drill element attached to the inner end portion of the threaded member to allow the drill element to be rotated and driven by the threaded member, and the outer anchor sleeve includes a projecting device extended into the bore of the outer anchor sleeve at the inner end portion of the outer anchor sleeve for selectively engaging with the thread shank of the threaded member and for ensuring the thread shank of the threaded member to be engaged with the inner end portion of the outer anchor sleeve.

The peripheral flange of the outer anchor sleeve is a helical flange. The projecting device of the outer anchor sleeve includes a peripheral swelling extended into the bore of the outer anchor sleeve at the inner end portion of the outer anchor sleeve.

The projecting device of the outer anchor sleeve includes at least one projection extended into the bore of the outer anchor sleeve at the inner end portion of the outer anchor sleeve. The enlarged head of the threaded member is engaged within a sunken depression of the work piece.

In the other arrangement, the positioning device may further be provided for positioning the outer anchor sleeve and the threaded member to the work piece and the wall member. For example, the positioning device includes an outer segment provided on the outer end portion of the outer anchor sleeve and having a length equals to a thickness of the work piece for allowing the enlarged head of the threaded member to be engaged with the work piece when the peripheral lip of the outer anchor sleeve is engaged with the wall member.

Alternatively, the positioning device includes an outer segment provided on the outer end portion of the outer anchor sleeve, and a block provided on the threaded member and engageable with the outer segment of the outer anchor sleeve for allowing the enlarged head of the threaded member to be engaged with the work piece when the peripheral lip of the outer anchor sleeve is engaged with the wall member.

Further alternatively, the positioning device includes a block provided on the threaded member and engageable with the outer end portion of the outer anchor sleeve for allowing the enlarged head of the threaded member to be engaged with the work piece when the peripheral lip of the outer anchor sleeve is engaged with the wall member.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 11 is another exploded view illustrating another arrangement of the outer anchor sleeve of the self-drilling wall anchor device;

FIG. 12 is a partial perspective view illustrating a portion of an outer anchor sleeve of the self-drilling wall anchor device as shown in FIG. 11;

FIG. 14 is a further exploded view illustrating the other arrangement of the outer anchor sleeve of the self-drilling wall anchor device; and FIG. 15 is a partial perspective view illustrating a portion of an outer anchor sleeve of the self-drilling wall anchor device as shown in FIG. 14.

DETAILED DESCRIPTION OF THE PREFERRED EMBODIMENT

Figure 1:
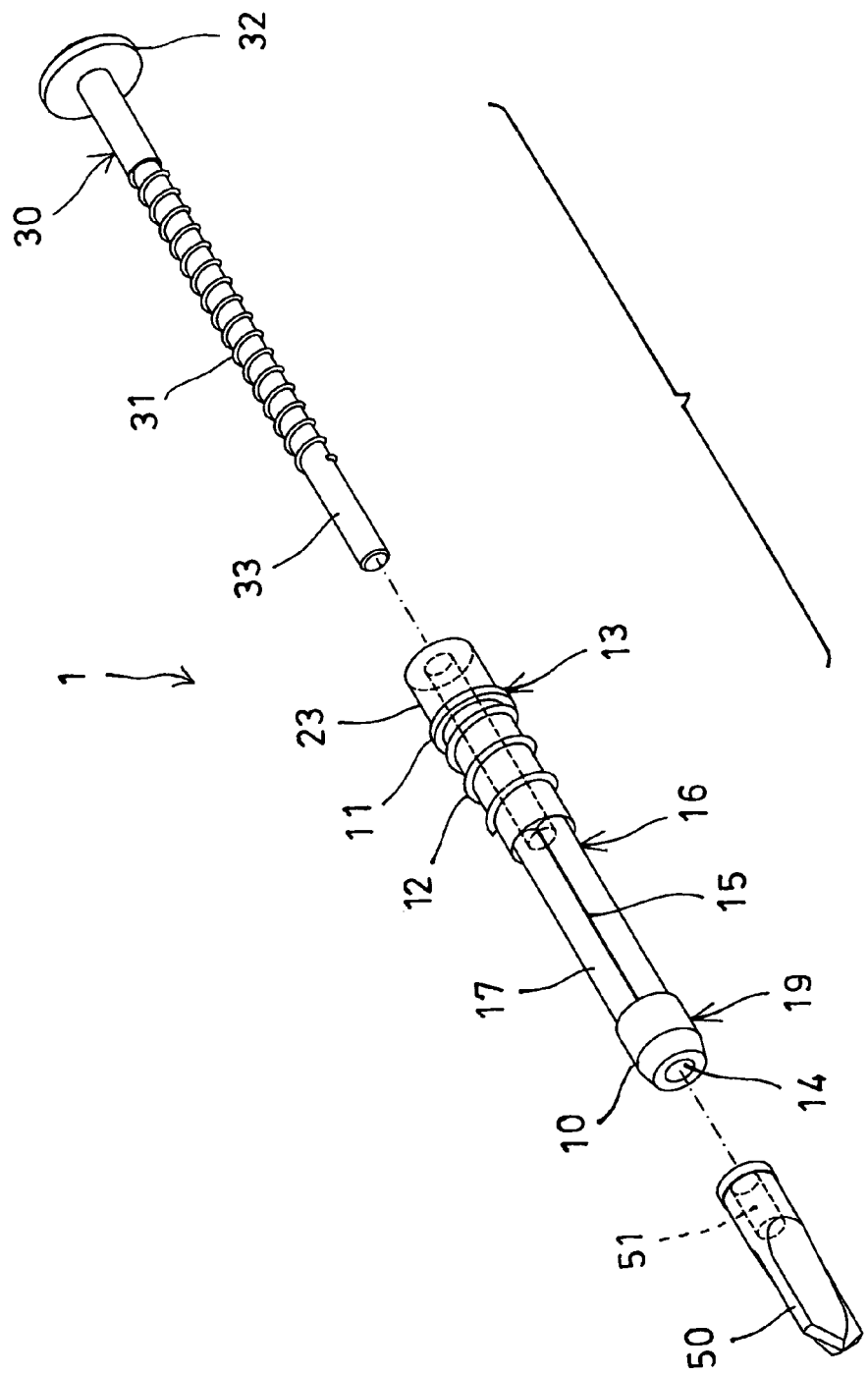
FIG. 1 is an exploded view of a self-drilling wall anchor device in accordance with the present invention.
Figure 4:
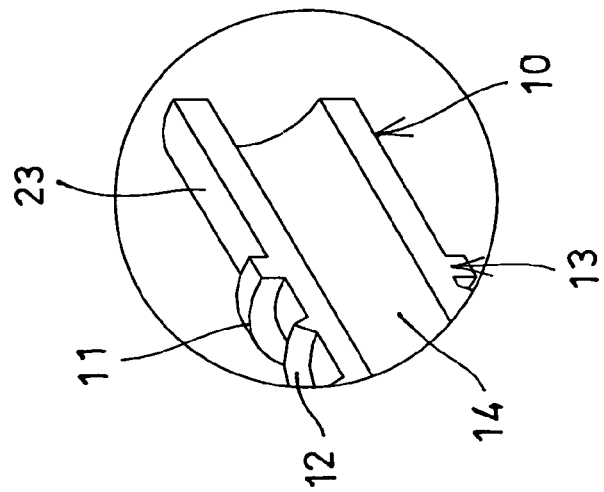
FIG. 4 is another partial perspective view illustrating the other portion of the outer anchor sleeve of the self-drilling wall anchor device.

Referring to the drawings, and initially to FIG. 1, a self-drilling wall anchor device 1 in accordance with the present invention comprises an outer anchor sleeve 10 including a peripheral lip 11 and an outer thread or one or more peripheral flanges or a helical flange 12 extended radially and outwardly from one end or outer end portion 13 thereof, in which the peripheral lip 11 may be provided for engaging with the wall member 80 (FIGS. 7-10) and for anchoring the outer anchor sleeve 10 to the wall member 80 or the like or for limiting the outer anchor sleeve 10 to move relative to the wall member 80. The outer anchor sleeve 10 includes a bore 14 formed therein for receiving or inserting or engaging with a threaded member 30 which includes a threaded shank 31 and an enlarged head 32 formed or provided on one end or outer end thereof for engaging with the outer end portion 13 of the outer anchor sleeve 10 (FIGS. 7-10).

The outer anchor sleeve 10 further includes one or more longitudinal slots 15 formed in a middle portion 16 of the outer anchor sleeve 10 and communicating with the bore 14 of the outer anchor sleeve 10 for forming one or more bendable or expandable or twistable arms 17 (FIGS. 1, 7) in the middle portion 16 of the outer anchor sleeve 10. The outer anchor sleeve 10 includes a peripheral protrusion 18 extended into the bore 14 of the outer anchor sleeve 10 at the other end or the inner end portion 19 of the outer anchor sleeve 10 for forming a narrowed inner end portion 19 for the outer anchor sleeve 10, or the peripheral protrusion 18 of the outer anchor sleeve 10 includes a narrower or decreased inner diameter than that of the bore 14 of the outer anchor sleeve 10 for threading or engaging with the threaded shank 31 of the threaded member 30 (FIGS. 7-10).

Figure 3:
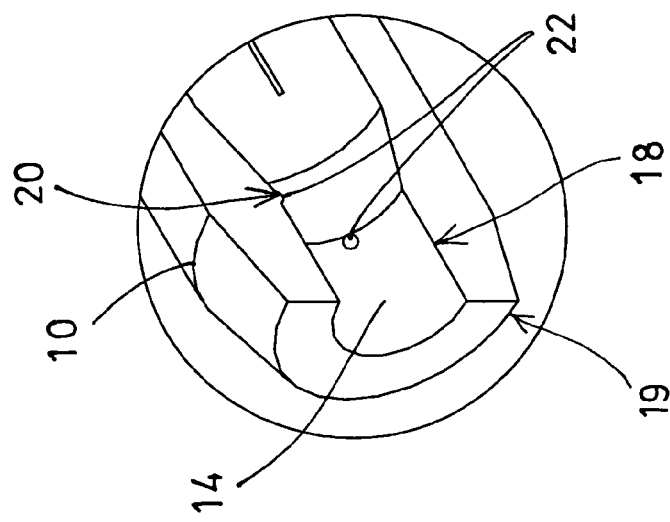
FIG. 3 is a partial perspective view similar to FIG. 2 illustrating the other arrangement of the outer anchor sleeve of the self-drilling wall anchor device.
Figure 2:
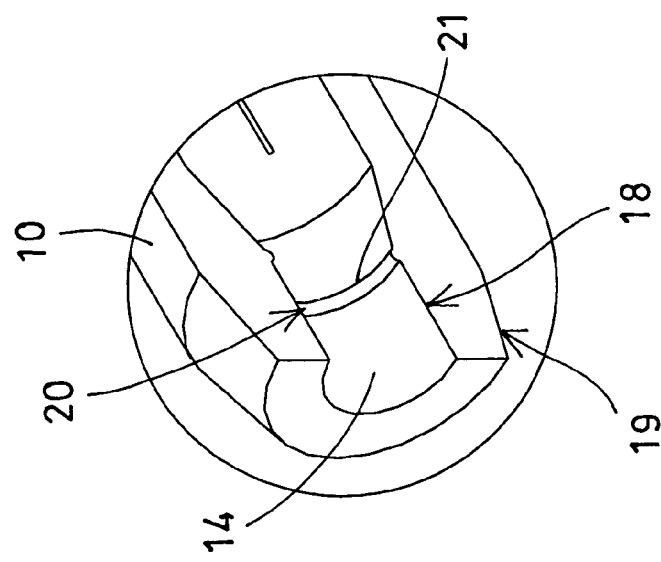
FIG. 2 is a partial perspective view illustrating a portion of an outer anchor sleeve of the self-drilling wall anchor device.
Figure 6:
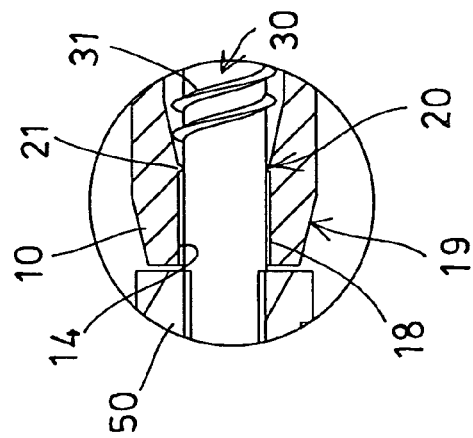
FIG. 6 is an enlarged partial cross sectional view illustrating the operation of the self-drilling wall anchor device as shown in FIG. 5.

The outer anchor sleeve 10 further includes a projecting device 20 (FIGS. 2, 3) extended into the bore 14 of the outer anchor sleeve 10 at the other end or the inner end portion 19 of the outer anchor sleeve 10, for example, the projecting device 20 of the anchor sleeve 10 may include a single peripheral swelling 21 (FIG. 2) or one or more projections 22 (FIG. 3) extended into the bore 14 of the outer anchor sleeve 10 for further threading or engaging with the threaded shank 31 of the threaded member 30 and thus for ensuring that the threaded shank 31 of the threaded member 30 be effectively threaded or engaged with the inner end portion 19 of the outer anchor sleeve 10 and for preventing the threaded shank 31 of the threaded member 30 from being freely rotated relative to the outer anchor sleeve 10.

The bore 14 of the outer anchor sleeve 10 at the other end or the inner end portion 19 of the outer anchor sleeve 10 may be slightly expanded due to a hot weather or in a humid environment such that the threaded shank 31 of the threaded member 30 may not be snugly engaged with the inner end portion 19 of the outer anchor sleeve 10 and such that the threaded shank 31 of the threaded member 30 may have a good chance to be freely rotated relative to the outer anchor sleeve 10 and such that the other end or the inner end portion 19 of the outer anchor sleeve 10 may not be pulled or forced toward the outer end portion 13 of the outer anchor sleeve 10 by the threaded member 30. The provision and the extension of the projecting device 20 into the bore 14 of the outer anchor sleeve 10 may make sure that the threaded shank 31 of the threaded member 30 be effectively threaded or engaged with the inner end portion 19 of the outer anchor sleeve 10.

A drill element 50 includes an orifice 51 formed in one end portion thereof for receiving the other end or the inner end portion 33 of the threaded member 30. The drill element 50 may be solidly secured to the threaded member 30 by such as latches or fasteners or ribs (not shown), by adhesive materials or by welding processes or the like for securing the drill element 50 to the threaded member 30, and thus for allowing the drill element 50 to be rotated or driven by the threaded member 30, and thus for allowing the drill element 50 to be forced to drill an opening 81 through a work piece 8 and/or an aperture 88 into the wall member 80 (FIGS. 5 and 7-10), and thus for allowing the inner end portion 19 and the middle portion 16 of the outer anchor sleeve 10 to be engaged through the opening 81 of the work piece 8 and the aperture 88 of the wall member 80 and for allowing the helical flange 12 of the outer anchor sleeve 10 to be threaded or engaged with the wall member 80 (FIGS. 7-10).

Figure 5:
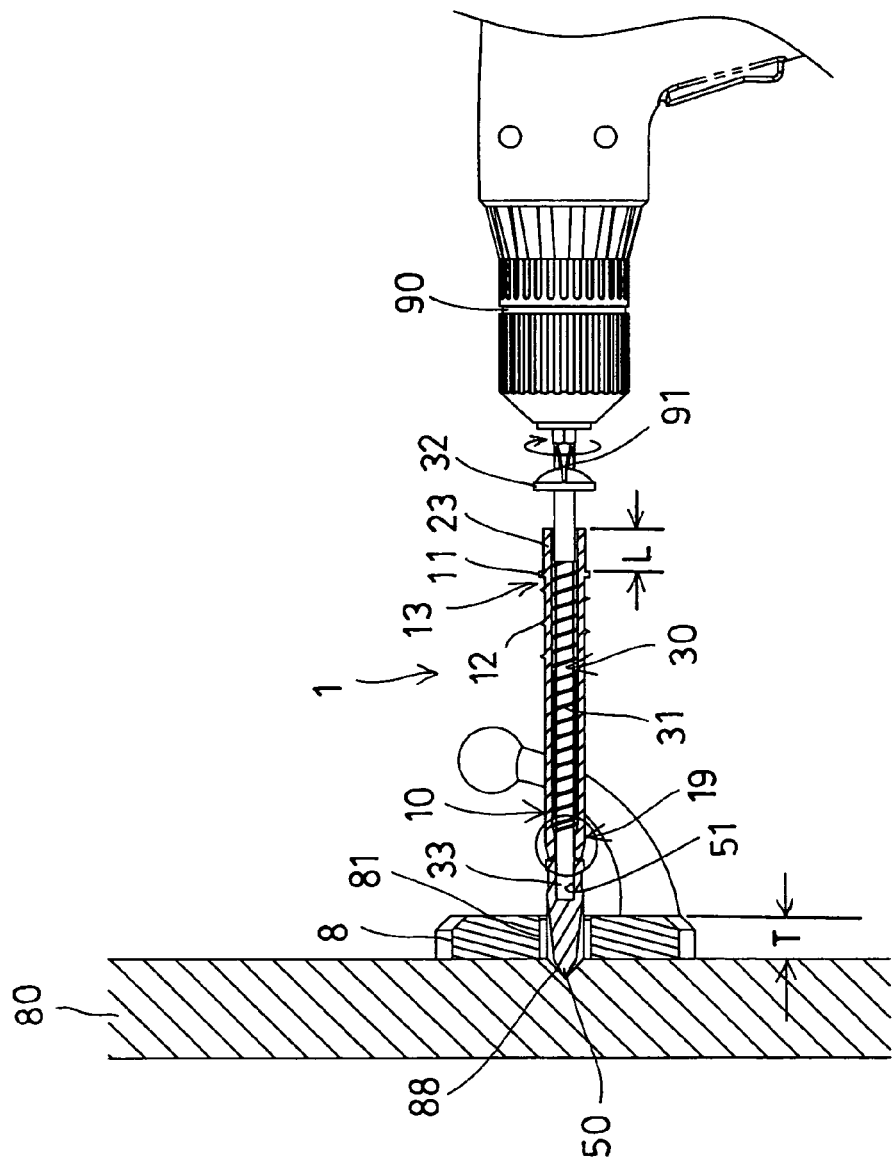
FIG. 5 is a partial cross sectional view illustrating the operation of the self-drilling wall anchor device.
Figure 7:
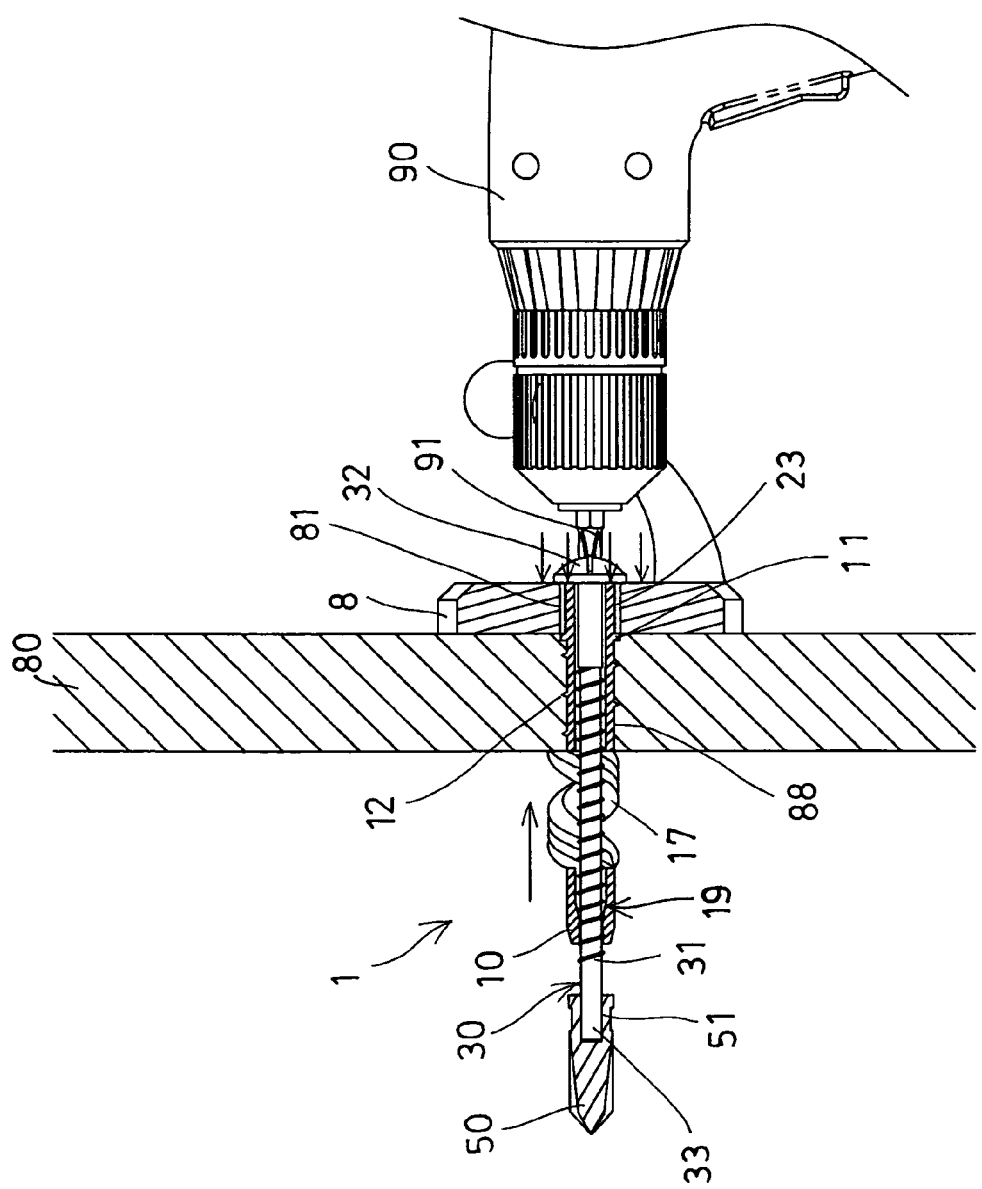
FIGS. 7, 8, 9 are partial cross sectional views similar to FIG. 5, illustrating the further operation of the self-drilling wall anchor device.

In operation, as shown in FIG. 5, the drill element 50 may be rotated or driven by the threaded member 30 with such as a driving stem 91 of a driving tool 90 in order to drill the opening 81 through the work piece 8 and/or the aperture 88 into the wall member 80 until the outer anchor sleeve 10 is engaged through the opening 81 of the work piece 8 and the aperture 88 of the wall member 80. As shown in FIG. 7, when the peripheral lip 11 of the outer anchor sleeve 10 is engaged with the wall member 80, the outer anchor sleeve 10 may be anchored to the wall member 80 for preventing the outer anchor sleeve 10 from being further engaged into the work piece 8 and the wall member 80.

Figure 8:
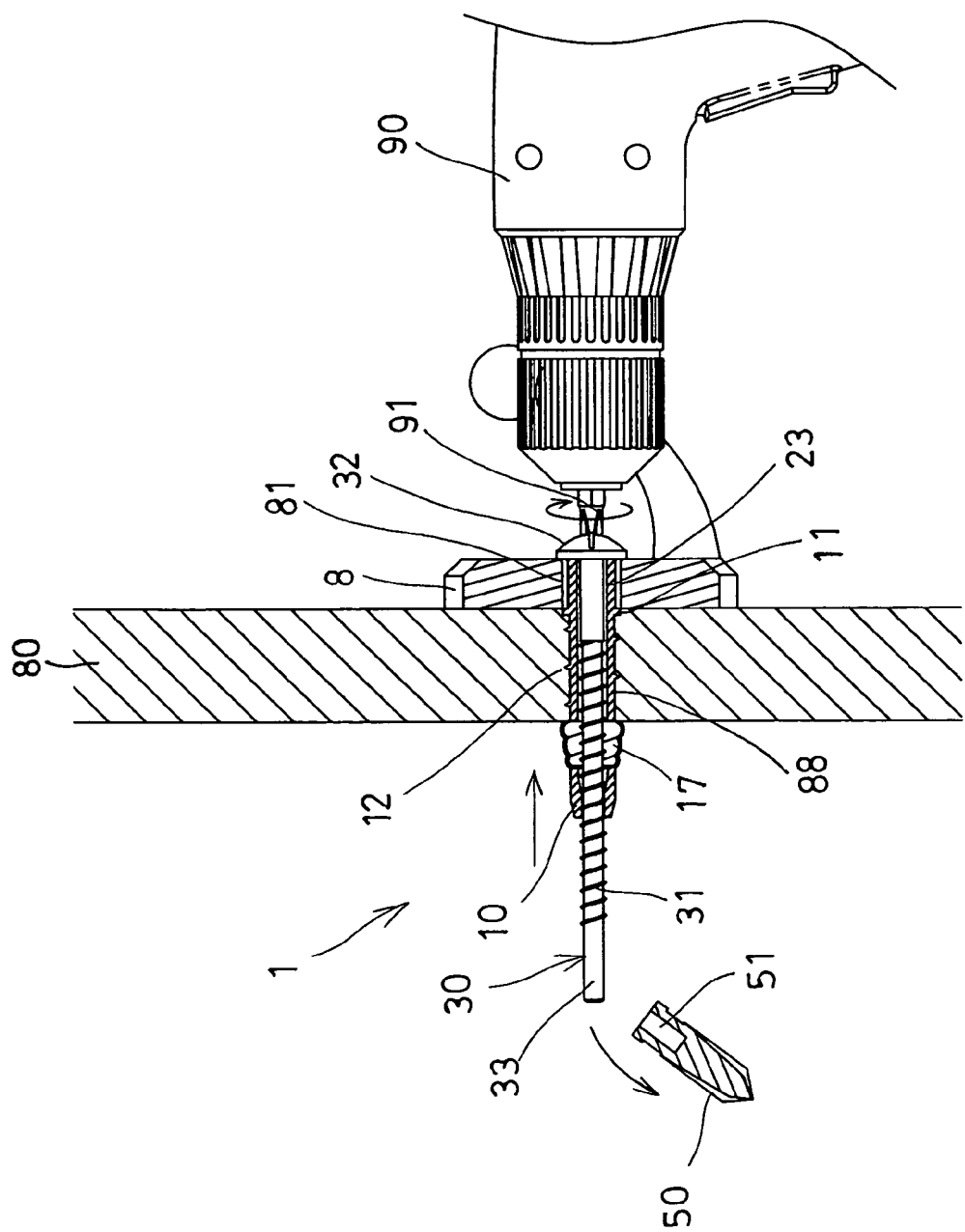
Figure 9:
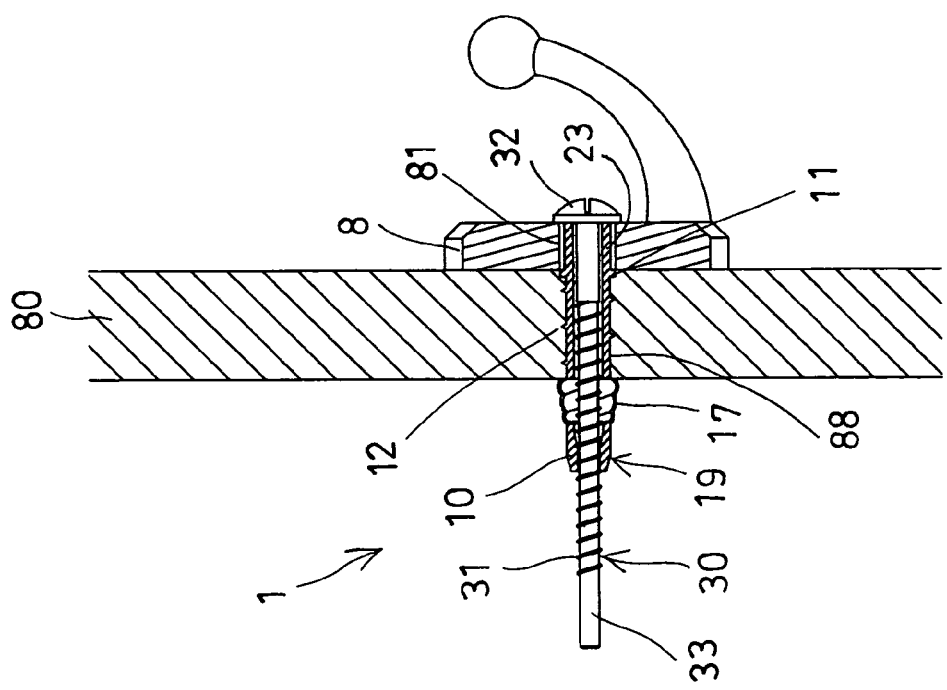

When the drill element 50 is further rotated or driven by the driving stem 91 of the driving tool 90 until the enlarged head 32 of the threaded member 30 is contacted or engaged with the outer end portion 13 of the outer anchor sleeve 10, the threaded shank 31 of the threaded member 30 may be engaged with the peripheral protrusion 18 of the outer anchor sleeve 10 or with the inner end portion 19 of the outer anchor sleeve 10 and/or with the projecting device 20 for allowing the inner end portion 19 of the outer anchor sleeve 10 to be pulled or forced toward the outer end portion 13 of the outer anchor sleeve 10 and thus for allowing the middle portion 16 or the arms 17 of the outer anchor sleeve 10 to be expanded or twisted or deformed by the threaded member 30 in order to solidly secure or anchor the outer anchor sleeve 10 and thus the work piece 8 to the wall member 80 (FIGS. 8, 9).

Figure 10:
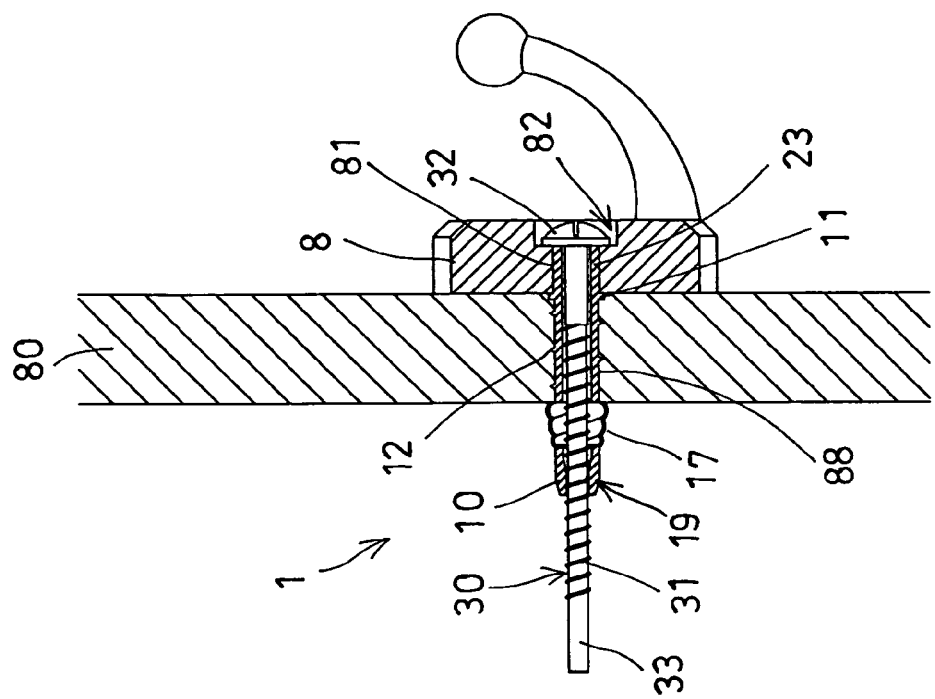
FIG. 10 is a partial cross sectional view similar to FIGS. 5 and 7-9, illustrating another arrangement of the work piece for the self-drilling wall anchor device.

The helical flange 12 of the outer anchor sleeve 10 may engage into the wall member 80 to allow the outer anchor sleeve 10 to be solidly secured to the wall member 80 and to be prevented from being disengaged from the wall member 80. Accordingly, again, it is to be mentioned that the provision and the extension of the projecting device 20 into the bore 14 of the outer anchor sleeve 10 may make sure that the threaded shank 31 of the threaded member 30 be effectively threaded or engaged with the inner end portion 19 of the outer anchor sleeve 10. The drill element 50 may be keyed to the threaded member 30 for allowing the drill element 50 to be disengaged from the threaded member 30 (FIG. 8) after drilling through the work piece 8 and the wall member 80. As shown in FIG. 10, the work piece 8 may include a sunken depression 82 formed therein for receiving the enlarged head 32 of the threaded member 30.

It is preferable that the outer anchor sleeve 10 includes an outer segment 23 provided on outer end portion 13 thereof and located further outer than the peripheral lip 11 of the outer anchor sleeve 10, and as shown in FIG. 5, the outer segment 23 of the outer anchor sleeve 10 includes a length "L" substantially equals to the depth or thickness "T" of the work piece 8 for allowing the enlarged head 32 of the threaded member 30 to be contacted or engaged with the work piece 8 when the peripheral lip 11 of the outer anchor sleeve 10 is engaged with the wall member 80.

Figure 13:
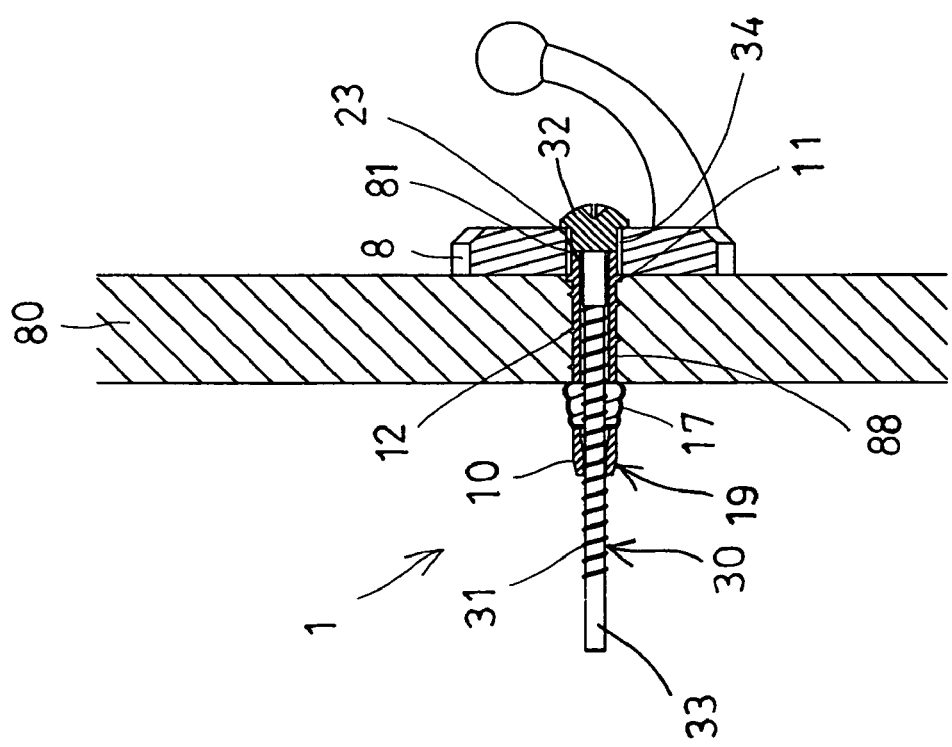
FIG. 13 is a partial cross sectional view illustrating the operation of the self-drilling wall anchor device as shown in FIGS. 11 and 12.

Alternatively, as shown in FIGS. 11-13, the outer segment 23 of the outer anchor sleeve 10 may includes a length shorter than the depth or thickness of the work piece 8, and the threaded member 30 may includes a block 34 provided or formed thereon and preferably located close to the enlarged head 32 or formed integral with the enlarged head 32, and the length of the outer segment 23 of the outer anchor sleeve 10 and the length of the block 34 the threaded member 30 may be substantially equals to the depth or thickness of the work piece 8 (FIG. 13) for allowing the enlarged head 32 of the threaded member 30 to be contacted or engaged with the work piece 8 when the peripheral lip 11 of the outer anchor sleeve 10 is engaged with the wall member 80.

Further alternatively, as shown in FIGS. 14-15, without the outer segment 23 of the outer anchor sleeve 10, the block 34 of the threaded member 30 may includes a length substantially equals to the depth or thickness of the work piece 8 for allowing the enlarged head 32 of the threaded member 30 to be contacted or engaged with the work piece 8 when the peripheral lip 11 of the outer anchor sleeve 10 is engaged with the wall member 80. The provision of the outer segment 23 on the outer anchor sleeve 10 and/or the formation of the block 34 on the threaded member 30 may ensure that the helical flange 12 of the outer anchor sleeve 10 be completely engaged into the wall member 80 before the inner end portion 19 of the outer anchor sleeve 10 is pulled or forced toward the outer end portion 13 of the outer anchor sleeve 10 and also before the middle portion 16 or the arms 17 of the outer anchor sleeve 10 is expanded or twisted or deformed by the threaded member 30. The outer segment 23 on the outer anchor sleeve 10 and/or the block 34 on the threaded member 30 may thus be formed as a positioning means for positioning the outer anchor sleeve 10 and the threaded member 30 to the work piece 8 and/or the wall member 80.

Accordingly, the self-drilling wall anchor device in accordance with the present invention includes an expandable and threaded structure for solidly engaging or securing to wall members or the like and for ensuring the operation of the self-drilling wall anchor device.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A wall anchor device for engaging and anchoring into a wall member and for anchoring a work piece to the wall member, said wall anchor device comprising:

an outer anchor sleeve including an outer end portion having a peripheral lip extended outwardly therefrom for engaging with the wall member and for anchoring said outer anchor sleeve to the wall member and for limiting said outer anchor sleeve to move relative to the wall member, and including at least one peripheral flange extended outwardly from said outer end portion thereof for engaging with the wall member, and including a middle portion having at least one slot formed therein for forming at least one arm and for engaging with the wall member, and for selectively anchoring said outer anchor sleeve to the wall member, said outer anchor sleeve including a bore formed therein, and including an inner end portion, a threaded member engageable into said bore of said outer anchor sleeve, and including a thread shank for threading with said inner end portion of said outer anchor sleeve, and including an enlarged head provided on an outer end thereof for selectively engaging with the work piece, and including an inner end portion, a drill element attached to said inner end portion of said threaded member to allow said drill element to be rotated and driven by said threaded member, said outer anchor sleeve including a projecting device protruding from an internal surface into said bore of said outer anchor sleeve at said inner end portion of said outer anchor sleeve for selectively engaging wit said thread shank of said treaded member and for ensuring that said thread shank of said threaded member is engaged with said inner end portion of said outer anchor sleeve, and an outer segment provided on said outer end portion of said outer anchor sleeve, said outer segment extending axially away from said peripheral lip to define a stopping surface for axially offsetting said enlarged head of said threaded member from said peripheral lip of said outer anchor sleeve when said peripheral lip of said outer anchor sleeve is engaged with the wall member 2. The wall anchor device as claimed in claim 1, wherein said threaded member includes a block portion extending axially inward from said enlarged head of said threaded member, said block portion defining a stopping surface extending radially beyond said threaded shank.

3. The wall anchor device as claimed in claim 1, wherein said internal surface at said inner end portion of said outer anchor sleeve is conically tapered about said bore.

4. The wall anchor device as claimed in claim 3, wherein said outer segment terminates said outer anchor sleeve, said outer segment extending axially away from said peripheral lip of said outer anchor sleeve to maintain said enlarged head of said threaded member axially offset from said peripheral lip substantially by a width of the work piece to be anchored to the wall member when said peripheral lip of said outer anchor sleeve is engaged with the wall member.

5. The wall anchor device as claimed in claim 1, wherein said internal surface at said inner end portion of said outer anchor sleeve forms a substantially smooth wall encircling said bore.

6. A wall anchor device for engaging and anchoring into a wall member and for anchoring a work piece to the wall member, said wall anchor device comprising:

an outer anchor sleeve including an outer end portion having a peripheral lip extended outwardly therefrom for engaging with the wall member and for anchoring said outer anchor sleeve to the wall member and for limiting said outer anchor sleeve to move relative to the wall member, and including at least one peripheral flange extended outwardly from said outer end portion thereof for engaging with the wall member, and including a middle portion having at least one slot formed therein for forming at least one arm and for engaging with the wall member, and for selectively anchoring said outer anchor sleeve to the wall member, said outer anchor sleeve including a bore formed therein, and including an inner end portion, a threaded member engageable into said bore of said outer anchor sleeve, and including a thread shank for threading with said inner end portion of said outer anchor sleeve, and including an enlarged head provided on an outer end thereof for selectively engaging with the work piece, and including an inner end portion, and a drill element attached to said inner end portion of said threaded member to allow said drill element to be rotated and driven by said threaded member, wherein said outer anchor sleeve defines a substantially smooth internal wall surface about said bore at said inner end portion, said outer anchor sleeve including a projecting device protruding from an said internal wall surface into said bore of said outer anchor sleeve at said inner end portion of said outer anchor sleeve for selectively engaging with said thread shank of said threaded member and for ensuring tat said thread shank of said threaded member is engaged with said inner end portion of said outer anchor sleeve, and an outer segment is provided on said outer end portion of said outer anchor sleeve, said outer segment extending axially away from said peripheral lip to define a stopping surface for axially offsetting said enlarged head of said threaded member from said peripheral lip of said outer anchor sleeve substantially by a width of the work piece to be anchored to the wall member when said peripheral lip of said outer anchor sleeve is engaged with the wail member 7. The wall anchor device as claimed in claim 6, wherein said threaded member includes a block portion extending axially inward from said enlarged head of said threaded member, said block portion defining a stopping surface extending radially beyond said threaded shank.

8. The wall anchor device as claimed in claim 6, wherein the internal wall surface about the bore at said inner end portion of said outer anchor sleeve is conically tapered.

* * * * *